United States Patent
Wong et al.

(10) Patent No.: US 6,748,375 B1
(45) Date of Patent: Jun. 8, 2004

(54) SYSTEM AND METHOD FOR CONTENT RETRIEVAL

(75) Inventors: Curtis G. Wong, Bellevue, WA (US); Steven M. Drucker, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 236 days.

(21) Appl. No.: 09/656,666

(22) Filed: Sep. 7, 2000

(51) Int. Cl.⁷ .............................................. G06F 17/30
(52) U.S. Cl. ................................. 707/3; 707/6
(58) Field of Search ................. 707/5, 4, 6, 3; 709/218, 250; 345/723, 721; 706/50

(56) References Cited

U.S. PATENT DOCUMENTS

| | | | |
|---|---|---|---|
| 6,018,768 A | * 1/2000 | Ullman et al. ............... | 709/218 |
| 6,041,182 A | * 3/2000 | Hart et al. .................... | 706/50 |
| 6,236,395 B1 | * 5/2001 | Sezan et al. ................. | 345/723 |
| 6,363,380 B1 | * 3/2002 | Dimitrova ..................... | 707/6 |
| 6,366,296 B1 | * 4/2002 | Boreczky et al. ........ | 707/104.1 |

OTHER PUBLICATIONS

Definition of neural network; http:/www.pcweopaedia.com/TREM/N//neural_network.htlm Feb. 12, 2003.*
Definition of expert system; http:/www.foldoc.doc.ic.ac.uk/foldoc/foldoc.cgi?expert+system Feb. 12, 2003.*
H. Lieberman, et al., *Let's Browse: A Collaborative Web Browsing Agent*, IUI 99. 1999. International Conference on Intelligent User Interfaces, Jan. 5–8 1999, pp.65–68.

S. Chakrabarti, *et al., Mining the Web's Link Structure*, Computer, vol. 32, No. 8, pp. 60–67.

P.O. Ogunbona, *et al., Content–Based Retrieval from compressed–Image Databases*, Data Compression Conference, Mar. 25–27, 1997 p. 461.

H.D. Wactlar, *et al., Intelligent Access to Digital Video: Informedia Project*, Computer, vol. 29, No. 5, pp. 46–52.

* cited by examiner

*Primary Examiner*—Diane D. Mizrahi
(74) *Attorney, Agent, or Firm*—Amin & Turocy, LLP

(57) ABSTRACT

A content retrieval system is provided. The system includes a communications signal analyzing system for receiving a communications signal and decoding the signal to generate key search terms associated with the communications signal. A search engine system performs a content based search using the key search terms. A display system displays search results from the search engine system concurrently with displaying an output corresponding to the communications signal.

27 Claims, 8 Drawing Sheets

SYSTEM AND METHOD FOR CONTENT RETRIEVAL

TECHNICAL FIELD

The present invention relates generally to computer systems, and more particularly to a system and method for retrieving web-based content associated with a particular communication.

BACKGROUND OF THE INVENTION

Global competition has led to an ever increasing demand for accessing relevant information quickly. Prompt access to relevant information can make the difference with respect to making money over losing money in the stock market. Demands on the media and journalists place a premium on obtaining relevant information before the competition. Other industries such as in the high technology sector and consulting fields require individuals in those industries to be on top of current events and trends with respect to certain markets. Accordingly, there is an ever increasing need for systems and methods which facilitate prompt access to relevant information.

SUMMARY OF THE INVENTION

The present invention relates to a system and method for retrieving content associated with a communication. One aspect of the invention relates to retrieving content associated with a program broadcast. A search (over the Internet for example) is conducted based on closed caption text associated with the communication, and search results are presented to a user while viewing the communication. For example, if the search was conducted over the Internet for web pages or sites relating to the text, the search results may include URLs (Unified Resource Locators) associated with the web pages or web sites. The text may be acted upon initially so as to generate key words in order to focus the search. For example, a natural language search system may be employed to provide a more focused search. Likewise, any suitable system (e.g., expert system, neural network, web browser search engines) may be employed to facilitate structuring the search and content retrieval in accordance with the present invention.

According to one specific aspect of the invention, a user can view a television broadcast on a personal computer. The television broadcast includes closed caption text associated with the broadcast. The present invention is also resident on the PC, and it performs a content based search over the Internet in connection with the closed caption text associated with the broadcast. The search is conducted dynamically, and the invention streams to the user search results based on the closed caption text. The search results may be cached if desired. The search results are presented in the form of active URLs, which allow the user to activate any particular URL presented and link to the site during the broadcast. The URLs may be presented in a separate window on the PC from the broadcast. Likewise, another window may be employed to view a web page associated with a particular URL activated by the user.

Thus, the present invention facilitates a user to dynamically retrieve relevant content-based information corresponding to a particular communication. The present invention is highly advantageous in environments where immediate access to relevant content based information is desired such as for example in connection with media, stocks, research, etc.

Another aspect of the invention relates to retrieving content associated with a communication based directly on audio communication (e.g., speech). The audio communication is input into an audio recognition system that recognizes the audio and converts the audio communication into a form (e.g., text or code) that the invention can employ to conduct a content-based search related to the audio communication. Search results are presented back to a user receiving the audio communication. For example, if a user is watching a newscast, the present invention will perform the content-based search based on audio communication associated with the newscast. The invention will provide the user with search results (e.g., URLs) that correspond to the audio communication.

In accordance with another aspect of the invention, pattern recognition may be employed to conduct a content-based search corresponding to visual indicia (e.g., image(s)) associated with a particular communication. Search results (e.g., URLs) corresponding to the visual indicia are provided back to the user.

Another aspect of the invention provides for employing a first client computer system and at least a second client computer system in connection with displaying and/or storing search results. For example, a portable computing system is provided which is operative to be employed in connection with a content retrieval system, the content retrieval system including a communications signal analyzing system which receives a communications signal and acting on the signal to generate key search terms associated with the communications signal; and a search engine system which performs a content based search over the Internet using the key search terms. The portable computing system comprises a first component for receiving search results from the content retrieval system; and a second component for displaying and/or storing at least a portion of the search results. It is to be appreciated that a filtering system may be employed in connection with any of the aforementioned aspects of the system so as to streamline search results in order to provide a user with more meaningful content-based information corresponding to the communication. For example, the search may be limited to particular sources (e.g., specific web sites or libraries).

Furthermore, it is to be understood that some if not all of the herein described aspects of the present invention may be employed in combination in order to enhance the content-based search. All such combinations are intended to fall within the scope of the hereto appended claims.

The following description and the annexed drawings set forth in detail certain illustrative aspects of the invention. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DETAILED DESCRIPTION OF THE INVENTION

Figure 1:
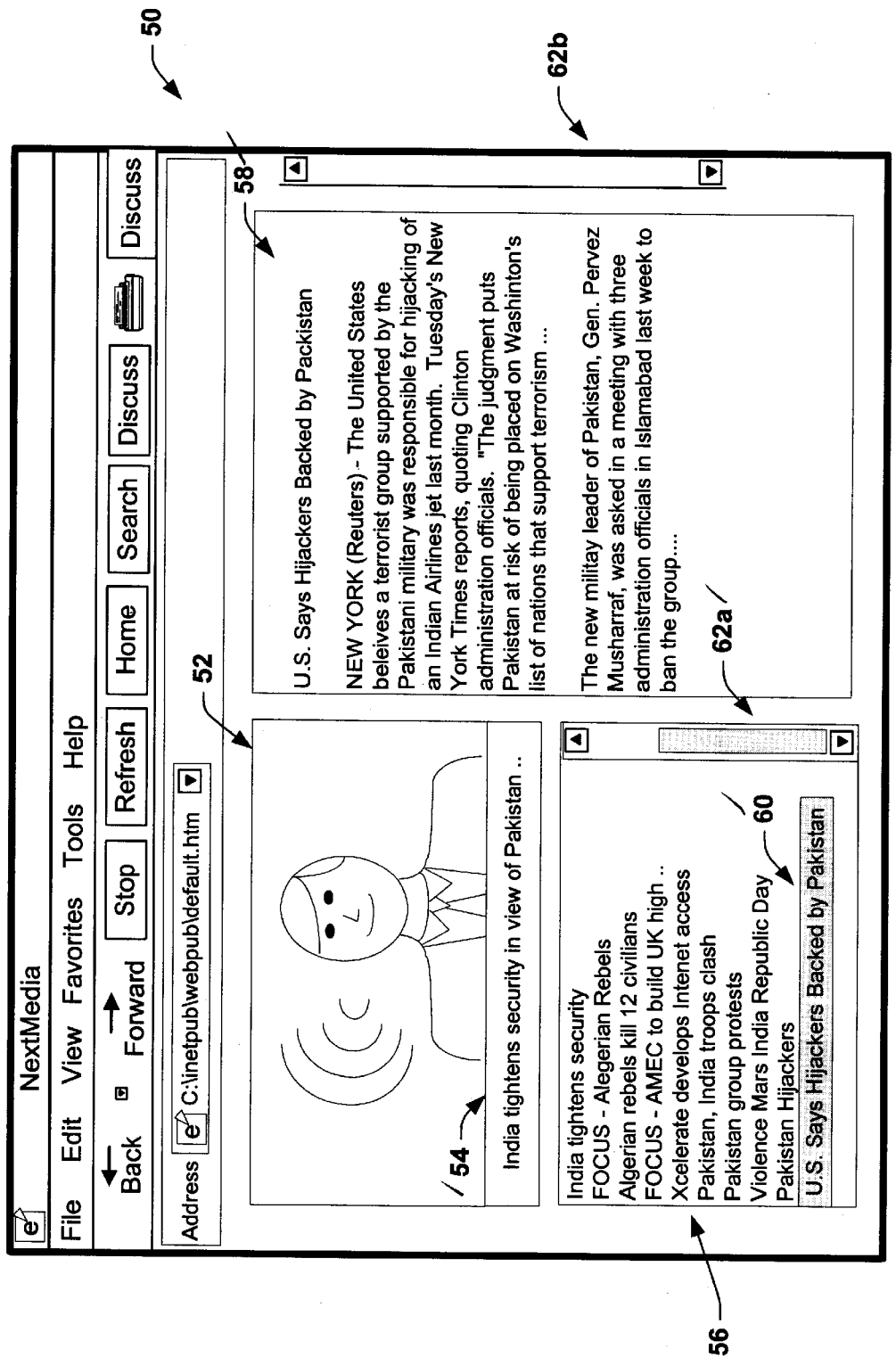
FIG. 1 is a schematic illustration of one specific user interface in accordance with the present invention.

The present invention is now described with reference to the drawings, wherein like reference numerals are used to refer to like elements throughout. In the following description, for purposes of explanation, numerous specific details are set forth in order to provide a thorough understanding of the present invention. It will be evident, however, to one skilled in the art that the present invention may be practiced without these specific details. In other instances, well-known structures and devices are shown in block diagram form in order to facilitate description of the present invention.

FIG. 1 illustrates a specific application of the present invention with respect to a television broadcast over the Internet. A user interface 50 is shown which includes a window 50 corresponding to a news broadcast. The news broadcast window 50 displays a television news broadcaster presenting news to viewers. The broadcast employs closed captioned technology which provides for presenting text to the viewers which correspond to the utterances of the news broadcaster. The closed captioned text is presented via closed caption window 54. According to this specific example, the present invention decodes the closed captioned text (e.g., via an ATI All-in-wonder tuner system resident on a person computer) into ASCII text. News stories may be segmented via ">>>" in the closed captioned broadcast stream—Cable News Network (CNN) and other news broadcasters commonly employ ">>>" to indicate a story boundary within the closed captioned stream. Additionally, ">>" may be employed by the present invention in discriminating between different speakers.

The present invention performs keyword extraction on the ASCII text to generate key words and/or terms which are employed by a search engine to perform a search on the Internet for content related to the broadcast. It is to be appreciated that the present invention is not limited to decoding the closed captioned text into ASCII text, and that other decoded formats are contemplated and intended to fall within the scope of the hereto appended claims. The search results are streamed back to the user and presented via search results window 56, which lists unified resource locators (URLs) found by the search engine. The search results window 56 includes a scroll bar 62a which allows a user to scroll among the list of URLs and select a URL of interest. In the present example, a URL 60 corresponding to "U.S. Says Hijackers Backed by Pakistan" is selected, and the content associated with the URL 60 is presented to the viewer via content window 58. The content associated with the URL 60 is a detailed news story relating to the United States believing a terrorist group was supported by the Pakistani military. A viewer can select any of the URLs displayed in window 56 and view the content associated with the URL sorted by date in window 58. A predetermined number of URLs are stored by the present invention and aged URLs are deleted as new URLs are added to the list. FIG. 1 provides one specific application of the present invention, and it is to be appreciated that numerous systems and/or methods for displaying content obtained in accordance with the present invention may be employed and all such systems and/or methods are intended to fall within the scope of the present invention.

Figure 2:
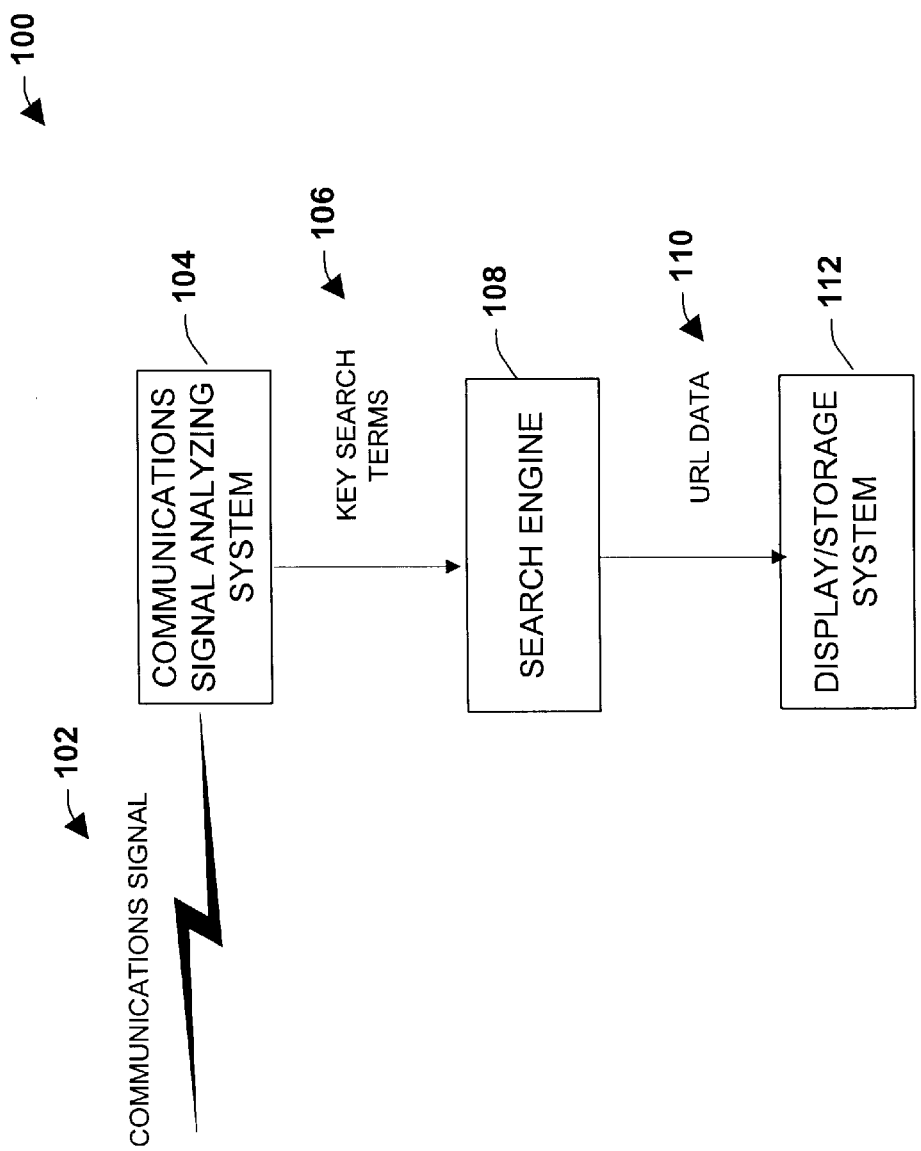
FIG. 2 is a schematic block diagram illustrating a system in accordance with the present invention.

Turning now to FIG. 2, a functional block diagram of a system 100 according to one aspect of the present invention is illustrated. A communications signal carrying information (e.g., television broadcast, radio broadcast, video, movie, images) is analyzed by a communications signal analyzing system (CSAS) 104. The CSAS 104 decodes the signal and generates key search terms 106 which are employed by a search engine 108 to perform a search for URLs, websites, or other sources of content related to the information contained within the signal 102. The search engine 108 conducts the search and outputs results 110 (e.g., URL data, websites, databases) to be displayed to a user via a display/storage system 112. The CSAS 104 may employ any suitable system or systems for key word/term extraction. For example, a neural network, an expert system, NLP d11 from NLP group may be employed in connection with key word/term extraction in accordance with the present invention. It is to be appreciated that the CSAS 104, search engine 108 and display/storage system 112 maybe part of a single computing system, or some or all 104, 108 and 112 may be part of separate computing systems. Furthermore, it is to be appreciated that the CSAS 104 and/or the search engine 108 may employ filters to refine the search and/or limit the search (e.g. to specific websites) in order to mitigate undesired search results. The display/storage system 112 may comprise a single computing system or a plurality of computer systems. A plurality of computer systems (e.g., internet television, and/or portable data assistant and/or portable computing system and/or wireless communication device and/or any other computing system suitable for displaying and/or storing at least data in connection with the present invention) may be employed to enhance displaying and/or organizing and/or storing the data. For example, a first computer system may be employed to display a broadcast and a second computer system be employed to receive and display and/or store search results (e.g., URL data) in connection with the present invention. As a result a user of the present invention could view a broadcast on a first computer system (e.g., an internet television) and have search results provided to and stored in a second computer system (e.g., portable data assistant), which the user could take to a remote location and analyze the search results at a later time, for example.

Figure 3:
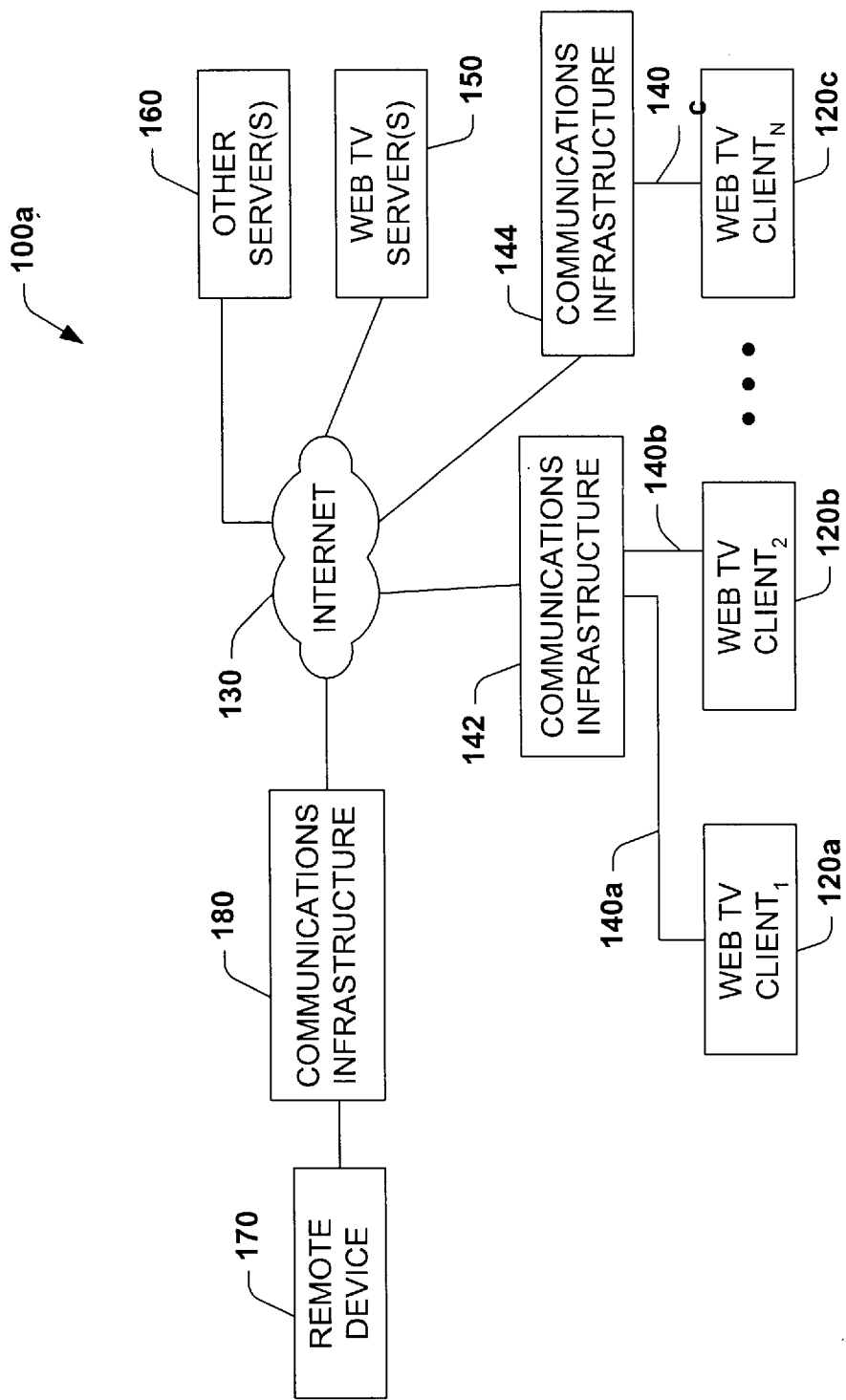
FIG. 3 is a schematic block diagram of a client system in accordance with the present invention.

Turning now to FIG. 3, by way of example, a system 100a in accordance with the present invention is a "WebTV™" system (hereinafter "WebTV") or MicrosoftTV (hereinafter "MSTV"), which includes a plurality of client systems 120a, 120b, and 120c. For purposes of brevity, FIG. 3 illustrates three client systems 120a, 120b, and 120c (hereinafter collectively referred to as "client systems 120"), although it is to be appreciated that a greater number of client systems may be employed (as indicated by the ellipsis). Briefly stated, each client system 120 employs a standard television set as a device for browsing the World Wide Web ("the Web") and is programmed and/or configured to connect to a conventional network infrastructure, such as the Internet 130. The connection between each client system 120a, 120b, 120c and the Internet 130 is made through a respective communications link or data connection 140a, 140b, 140c. A communications link may be, for example, a standard telephone, ISDN (Integrated Services Digital Network), cable modem or other similar communications path. In the example of FIG. 3, communications links 140*a* and 140*b* connect the client systems 120*a* and 120*b*, respectively, to the Internet 130 through a common communications infrastructure 142, such as a modem pool at an Internet service provider ("ISP"). The communications link 140*c* connects the client system 120*c* to the Internet 130 through another communications infrastructure 144 such as, for example, another ISP or a private Internet server.

Each client system 120 may access, via the Internet 130 (generally), WebTV Network or MSTV services provided by one or more remote WebTV or MSTV servers 150. The WebTV/MSTV Network services are used in conjunction with software running in a client system to enable the user to browse the Web, and to make use of the Internet in various other known ways. A filtering mechanism also may be programmed at the client system 120 to refine searches and more efficiently navigate the Web. It is to be appreciated that each client system 120 also may communicate with one or more other servers 160, which also may provide other Internet-based services, as is known in the art. The servers 150 and/or 160 may comprise multiple physical and logical devices connected in a distributed architecture. Each client system 120 may connect to the servers 150 and 160 either through a direct data connection (not shown) (e.g., telephone, ISDN, cable modem, etc.) or through the Internet 130 via its associated communications path. Each client system 120 also receives audio and/or visual programming content in a predetermined format. Examples of signal formats include the Motion Picture Experts Group ("MPEG") family of compression/decompression standards, although other data formats also may be utilized. Examples of systems employing such standard formats that may be implemented in a system, in accordance with the present invention, include Direct Satellite Systems ("DSS"), Advanced Television (ATV) systems, Digital Television (DTV) systems, Video-on-Demand, MPEG over ATM Networks, High Definition Television (HDTV), cable (e.g., DVB-C) etc.

A remote device 170, such as a personal computer ("PC"), also is illustrated as being connectable to the Internet 130 through a communications infrastructure 180. The communications infrastructure 180, for example, is a modem bank associated with another ISP. While, for purposes of brevity, a single device 170 is shown in FIG. 3, it is to be appreciated that numerous PC's and/or other types of remote devices (both wired and wireless devices) may be connectable to the Internet for use in accordance with the present invention. The remote PC 170 is located remotely from the client systems 120, although it may be located in generally the same physical location (e.g., an individual's home) as one of the client systems.

Figure 4:
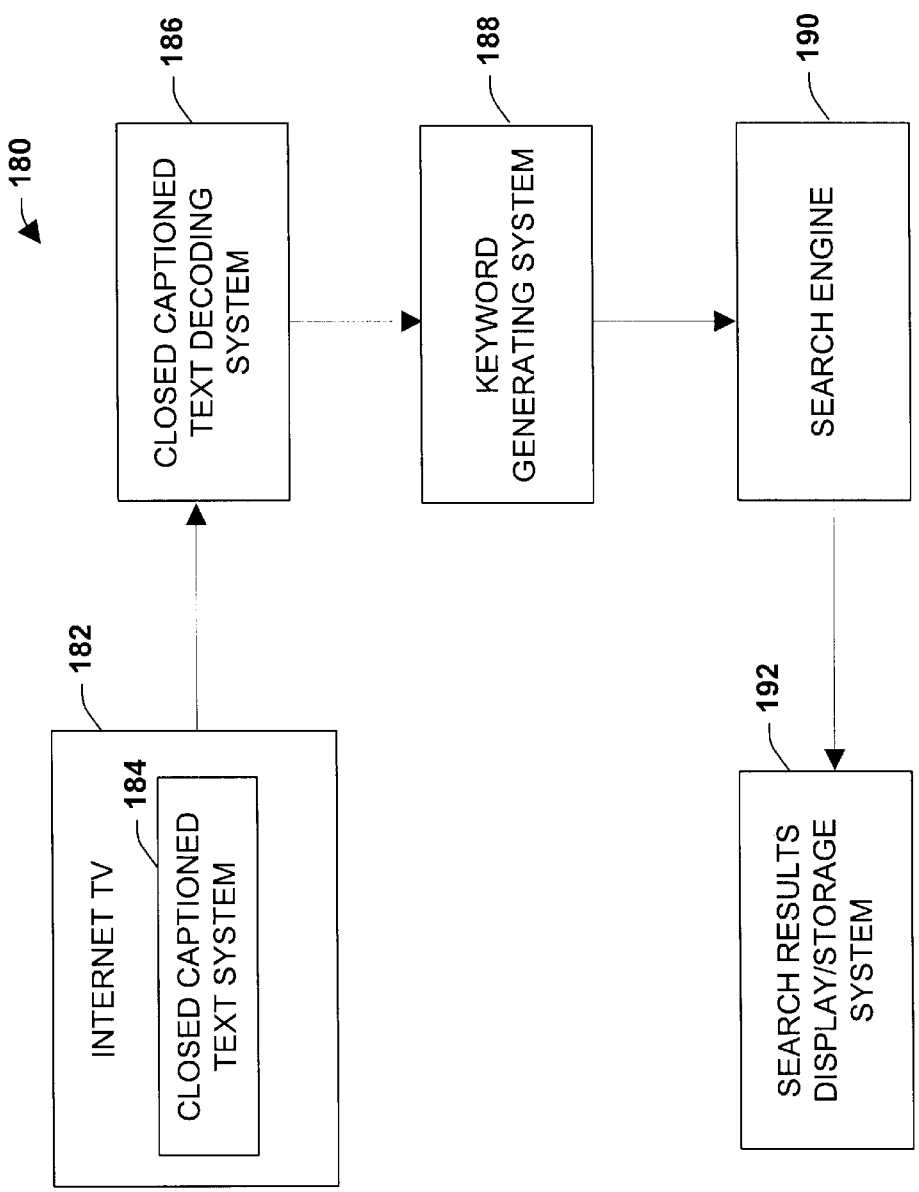
FIG. 4 is a functional block diagram of an aspect of the present invention relating to closed captioned text.

FIG. 4 illustrates an aspect of the present invention relating to a system 180 which decodes closed captioned data associated with a communication. The system 180 includes an Internet TV system 192 which displays a television signal broadcast over the Internet. The system includes a closed captioned text system which extracts and displays closed captioned information in connection with the broadcast. A closed captioned decoding system 186 decodes the closed captioned information (CCI) and converts the CCI to a format suitable for use by a keyword generating system (KWGS) 188. For example, the CCI may be converted into ASCII text which is acted upon by the KWGS to generate key words and/or key terms to be employed by a search engine 190. The search engine 190 performs a search using the generated key words and/or key terms and a search results display system (SRDS) 192 displays the search results (e.g., URLs corresponding to websites containing content related to the closed captioned information of the broadcast). The SRDS 192 may store all or portions of the search results. Furthermore, the SRDS 192 may comprise a plurality of computer systems, each computer system performing different or similar functions with respect to displaying and storing all or respective portions of the search result data.

Figure 5:
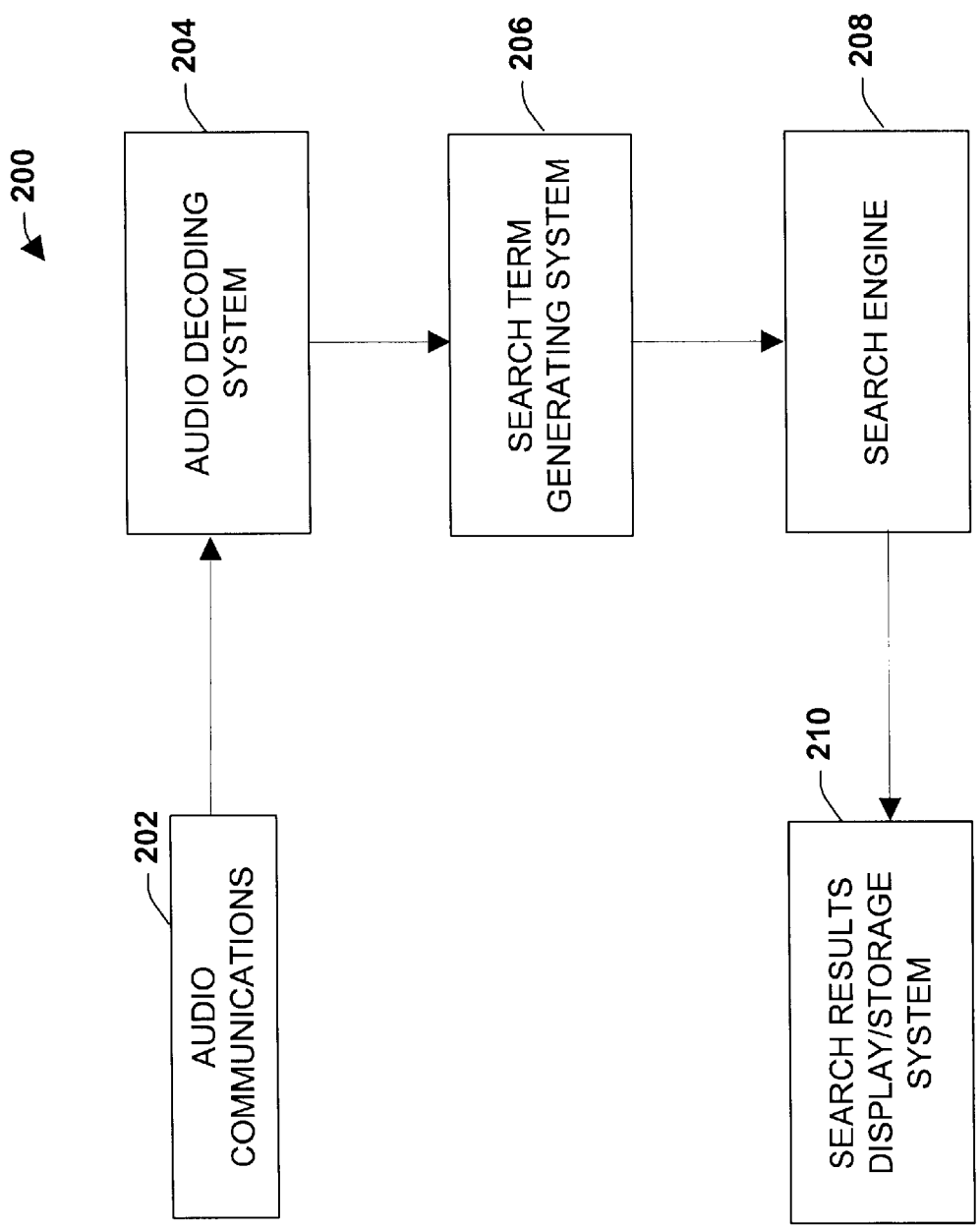
FIG. 5 is a functional block diagram of an aspect of the present invention relating to audio information.

FIG. 5 illustrates an aspect of the present invention relating to a system 200 which decodes audio communications data associated with a communication. The system 200 includes an audio communications system 202 which outputs a signal broadcasting audio. The system 200 includes an audio decoding system 204 which decodes the audio information and converts the audio information to a format suitable for use by a keyword generating system (KWGS) 188. The audio decoding system 204 may include a speech recognition system, and/or neural network and/or expert system and/or other suitable system to facilitate converting the audio information to a suitable format. A search engine 206 performs a search using the generated key words and/or key terms generated by the KWGS 188, and a search results display system (SRDS) 210 displays the search results (e.g., URLs corresponding to websites containing context related to the audio information of the broadcast. The SRDS 210 may store all or portions of the search results. Furthermore, the SRDS 210 may comprise a plurality of computer systems, each computer system performing different or similar functions with respect to displaying and/or storing all or respective portions of the search result data.

Figure 6:
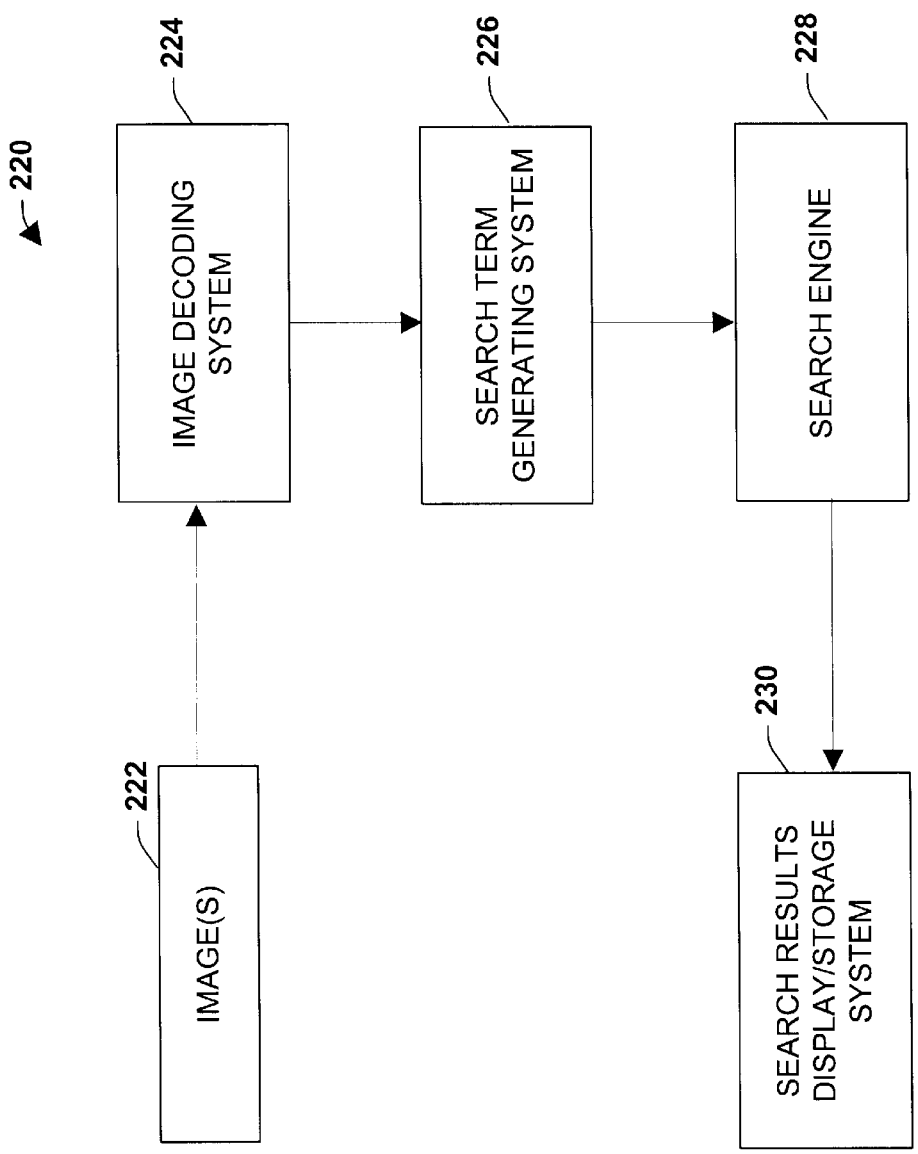
FIG. 6 is a functional block diagram of an aspect of the present invention relating to image information.

FIG. 6 illustrates an aspect of the present invention relating to a system 220 which decodes image data associated with a communication. The system 220 includes an image system 222 which outputs a signal including image data associated with a communication. The system 222 includes an image decoding system 224 which decodes the image information and converts the image information to a format suitable for use by a search term generating system 226. The image decoding system 224 may include a pattern recognition system and/or colour recognition system and/or neural network and/or expert system and/or other suitable system to facilitate converting the image information to a suitable format. A search engine 228 performs a search using the generated key words and/or key terms generated by the search term generating system 226, and a search results display system (SRDS) 230 displays the search results (e.g., URLs corresponding to websites containing content related to the image information of the broadcast). The SRDS 230 may store all or portions of the search results. Furthermore, the SRDS 230 may comprise a plurality of computer systems, each computer system performing different or similar functions with respect to displaying and/or storing all or respective portions of the search result data.

Figure 7:
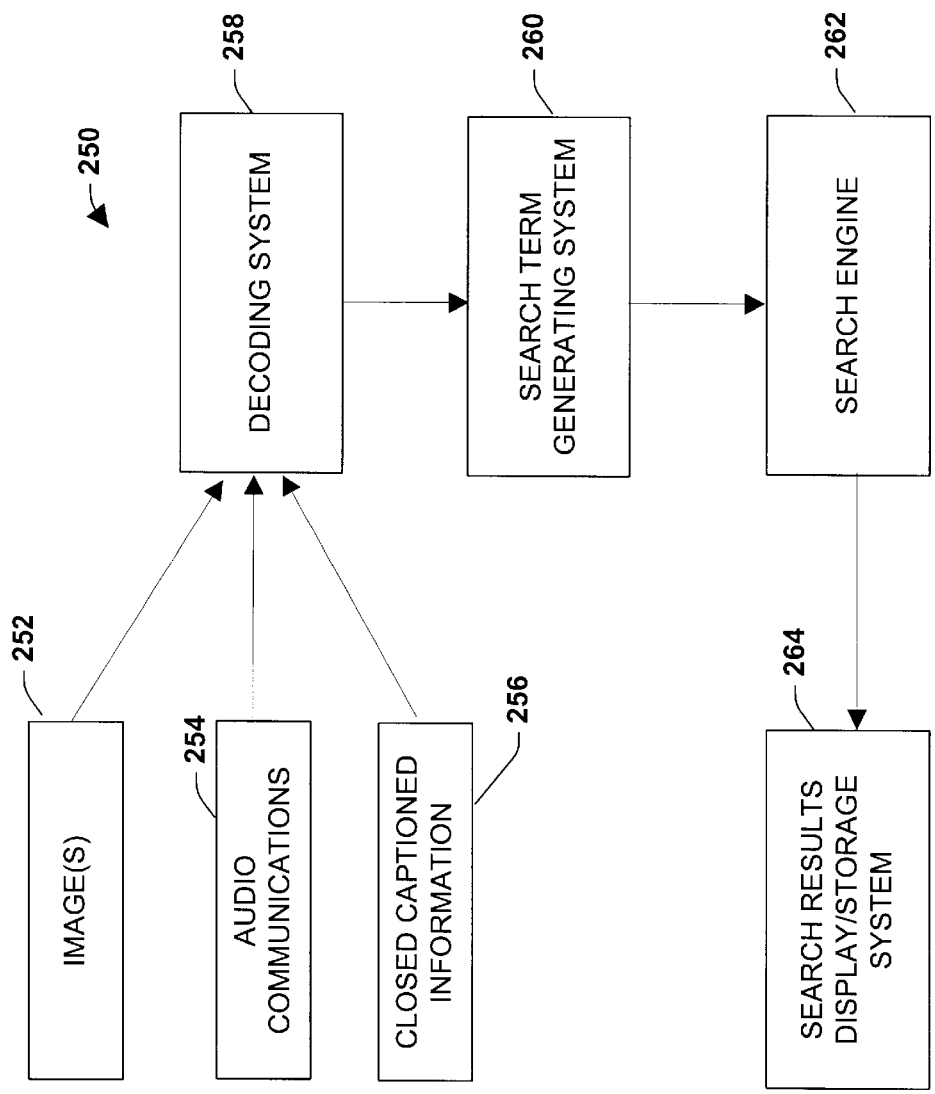
FIG. 7 is a functional block diagram of an aspect of the present invention relating to image, audio and closed captioned information.

FIG. 7 illustrates an aspect of the present invention relating to a system 256 which decodes image, audio and closed captioned data associated with a communication. The system 250 includes an image communications system 252 which outputs a signal broadcasting image data. The system 250 includes an audio communications system 254 which outputs a signal broadcasting audio. A CCI system 256 outputs CC data A. decoding system 258 decodes the image, audio and CCI information and converts the information to a format suitable for use by a search term generating system 260. The decoding system 258 may include a speech recognition system, and/or pattern recognition system and/or neural network and/or expert system and/or other suitable system to facilitate converting the audio information to a suitable format. The combination of using image and/or audio and/or CCI data facilitates obtaining desired content-based information via search engine 262. The search engine 262 performs a search using the generated key words and/or key terms generated by the search term generating system 260, and a search results display system (SRDS) 264 displays the search results (e.g., URLs corresponding to websites containing content related to the audio information of the broadcast). The SRDS 264 may store all or portions of the search results. Furthermore, the SRDS 264 may comprise a plurality of computer systems, each computer system performing different or similar functions with respect to displaying and/or storing all or respective portions of the search result data in order to provide a context for the various aspects of the invention, FIG. 8 and the following discussion are intended to provide a brief, general description of a suitable computing environment in which the various aspects of the present invention may be implemented.

Figure 8:
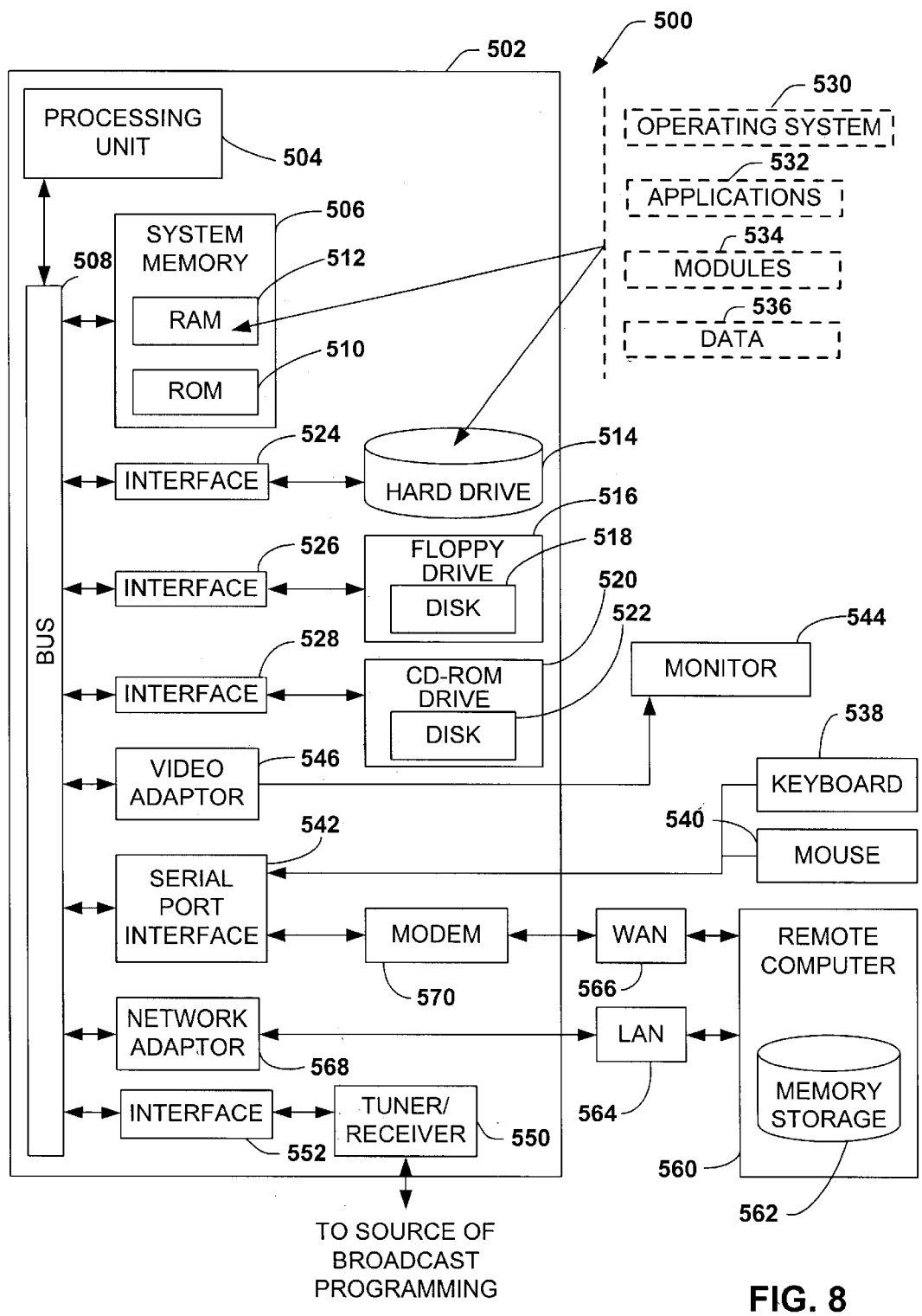
FIG. 8 is a block diagram of an exemplary operating environment for a system configured in accordance with the present invention.

With reference to FIG. 8, an exemplary environment 500 for implementing various aspects of the invention includes a client system 502 (e.g., a specially configured computer that is part of a WebTV or MSTV system), including a processing unit 504, a system memory 506, and a system bus 508 that couples various system components including the system memory to the processing unit 504. The processing unit 504 may be any of various commercially available processors.

The system bus 508 may be any of several types of bus structure including a memory bus or memory controller, a peripheral bus, and a local bus using any of a variety of conventional bus architectures such as PCI, VESA, Microchannel, ISA, and EISA, to name a few. The client system 502 memory includes read only memory (ROM) 510 and random access memory (RAM) 512. A basic input/output system (BIOS), containing the basic routines that help to transfer information between elements within the client system 502, such as during start-up, is stored in ROM 510.

The client system 502 further includes a hard disk drive 514, a magnetic disk drive 516, e.g., to read from or write to a removable disk 518, and an optical disk drive 520, e.g., for reading a CD-ROM disk 522 or to read from or write to other optical media. The hard disk drive 514, magnetic disk drive 516, and optical disk drive 520 are connected to the system bus 508 by a hard disk drive interface 524, a magnetic disk drive interface 526, and an optical drive interface 528, respectively. The drives and their associated computer-readable media provide nonvolatile storage of data, data structures, computer-executable instructions, etc. for the client system 502, including for the storage of broadcast programming in a suitable digital format. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment, and further that any such media may contain computer-executable instructions for performing the methods of the present invention.

A number of program modules may be stored in the drives and RAM 512, including an operating system 530, one or more application programs 532, other program modules 534, and program data 536. The operating system 530 in the illustrated computer is, for example, the "Microsoft Windows NT" Server operating system, although it is to be appreciated that the present invention may be implemented with other operating systems or combinations of operating systems.

A user may enter commands and information into the client system 502 through a keyboard 538 and a pointing device, such as a mouse 540. Other input devices (not shown) may include a microphone, an IR remote control, a joystick, a game pad, a satellite dish, a scanner, or the like. These and other input devices are often connected to the processing unit 504 through a serial port interface 542 that is coupled to the system bus 508, but may be connected by other interfaces, such as a parallel port, a game port, a universal serial bus (USB), an IR interface, etc. A monitor 544 or other type of display device (e.g., a television) is also connected to the system bus 508 via an interface, such as a video adapter 546. In addition to the monitor, a computer typically includes other peripheral output devices (not shown), such as speakers, printers etc.

The client system 502 also includes a tuner/receiver 550, which is connected to the bus 508 through an appropriate interface 552. As described herein, the tuner/receiver 550 receives audio and/or visual programming that is broadcast over some transmission medium (air, coaxial cable, fiber optic cable, etc). The tuner/receiver 550 demodulates the received signal and provides it to the bus 508, so that it may, in turn, be displayed at the monitor 544, such as a television.

The client system 502 may operate in a networked environment using logical connections to one or more remote computers, such as a remote server computer 560 (e.g. a WebTV/MSTV server) or a remote PC or STB. The remote computer 560 may be a workstation, a server computer, a router, a peer device or other common network node, and typically includes many or all of the elements described relative to the client system 502, although, for purposes of brevity, only a memory storage device 562 is illustrated in FIG. 8. In addition, the remote computer 560 may be programmed to employ masking in accordance with the present invention, relative to one or more devices operatively associated therewith, including part of the client system 502. The logical connections depicted in FIG. 8 include a local area network (LAN) 564 and a wide area network (WAN) 566. Such networking environments are commonplace in offices, enterprise-wide computer networks, intranets and the Internet.

When used in a LAN networking environment, the client system 502 is connected to the local network 564 through a network interface or adapter 568. When used in a WAN networking environment, the client system 502 typically includes a modem 566, or is connected to a communications server on the LAN, or has other means for establishing communications over the WAN 566, such as the Internet. The modem 570, which may be internal or external, is connected to the system bus 508 via the serial port interface 542. In a networked environment, program modules depicted relative to the client system 502, or portions thereof, may be stored in the remote memory storage device 562. It will be appreciated that the network connections shown are exemplary and other means of establishing a communications link between the computers may be used.

In accordance with the practices of persons skilled in the art of computer programming, the present invention has been described with reference to acts and symbolic representations of operations that are performed by a computer, such as the client system 502 or remote computer 560, unless otherwise indicated. Such acts and operations are sometimes referred to as being computer-executed. It will be appreciated that the acts and symbolically represented operations include the manipulation by the processing unit 504 of electrical signals representing data bits which causes a resulting transformation or reduction of the electrical signal representation, and the maintenance of data bits at memory locations in the memory system (including the system memory 506, hard drive 514, floppy disks 518, CD-ROM 522) to thereby reconfigure or otherwise alter the computer system's operation, as well as other processing of signals. The memory locations where such data bits are maintained are physical locations that have particular electrical, magnetic, or optical properties corresponding to the data bits. What has been described above are preferred aspects of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, combinations, modifications and variations that fall within the spirit and scope of the appended claims. Furthermore, to the extent that the term "includes" is used in either the detailed description or the claims, such term is intended to be inclusive in a manner similar to the term "comprising."

What is claimed is:

1. A content retrieval system comprising:

a communications signal analyzing system which receives a communications signal and acts on the signal to generate key search terms associated with the communications signal;

a search engine system that performs dynamic content-based Internet searches in response to the generation of key search terms; and a displays system which displays search results from the search engine system concurrently with displaying an output corresponding to the communications signal.

2. The system of claim 1, further including a filtering system to limit the search to at least one website.

3. The system of claim 1, further including a natural language search system.

4. The system of claim 1, further including a neural network.

5. The system of claim 1, further including an expert system.

6. The system of claim 1, the search results including active URLs.

7. The system of claim 1, the communications signal being a television broadcast.

8. The system of claim 1, the communications signal being a radio broadcast.

9. The system of claim 1, further including a pattern recognition system.

10. A content retrieval system comprising:

means for analyzing for receiving a communications signal and analyzing the signal to generate key search terms associated with the communications signal;

means for performing dynamic content based searches using the key search terms; and means for displaying search results from the search engine system concurrently with displaying an output corresponding to the communications signal.

11. The system of claim 10, further means for limiting the search to at least one webside.

12. The system of claim 10, further including means for performing a natural language search.

13. The system of claim 10, the search results including active URLs.

14. The system of claim 10, further including means for pattern recognition.

15. A method for obtaining content associated with a communication comprising:

receiving the communication;

analyzing the communication and generating one or more key search terms corresponding to the communication;

performing an Internet based search using the key search terms for content relating to the communication, wherein the search is initiated upon generation of one or more search terms; and displaying results of the search to the user concurrently with outputting the communication to the user.

16. The system of claim 15, further including the step of using a filtering system to limit the search to at least one website.

17. The system of claim 15, further including the step of using a natural language search system.

18. The system of claim 15, further including the step of using a neural network.

19. The system of claim 15, further including the step of using an expert system.

20. The system of claim 15, further including the step of using a pattern recognition system.

21. A content retrieval system comprising:

a closed captioned information decoding system which receives closed captioned information associated with a communications signal and decoding the closed captioned information;

a keyword generating system which receives decoded closed captioned information from the closed captioned information decoding system to generate key search terms associated with the communications signal;

a search engine system which performs one or more content based searches using the key search terms in response to the generation thereof; and a display system which displays search results from the search engine system concurrently with displaying an output corresponding to the communications signal.

22. A content retrieval system comprising:

an audio decoding system which receives audio information associated with a communications signal and decoding the audio information;

a keyword generating system which receives decoded audio information from the audio decoding system to generate key search teams associated with the communications signal;

a search engine system which performs one or more content based searches using the key search terms in response to the generation thereof; and a display system which displays search results from the search engine system concurrently with displaying an output corresponding to the communications signal.

23. A content retrieval system comprising:

an image decoding system which receives image information associated with a communications signal and decoding the image information;

a keyword generating system which receives decoded image information from the image decoding system to generate key search terms associated with the communications signal;

a search engine system which performs one or more content based searches using the key search terms in response to the generation thereof; and a display system which displays search results from the search engine system concurrently with displaying an output corresponding to the communications signal.

24. A content retrieval system comprising:

a communications signal analyzing system which receives a communications signal and acting on the signal to generate key search terms associated with the communications signal;

a search engine system which performs a content based search over the Internet using and in response to the generation of key search terms; and a display system which displays search results from the search engine system concurrently with displaying an output corresponding to the communications signal, the display system comprising at least a first computer system and a second computer system.

25. The system of claim 24, the first computer system providing for displaying information in connection with the communications signal.

26. The system of claim 24, the second computer system providing for storing information in connection with the search results.

27. A portable computing system operative to be employed in connection with a content retrieval system, the content retrieval system including a communications signal analyzing system which receives a communications signal and acting on the signal to generate key search terms associated with the communications signal; and a search engine system which performs a dynamic content based search over the Internet using one or more generated key search terms, the portable computing system comprising:

a first component for receiving search results from the content retrieval system; and a second component for concurrently displaying and/or storing at least a portion of the search results with the received communications signal.

* * * * *